March 3, 1953     B. G. COPPING     2,630,505
PRESSURE SENSITIVE CONTROL DEVICE
Original Filed July 7, 1949     3 Sheets-Sheet 1
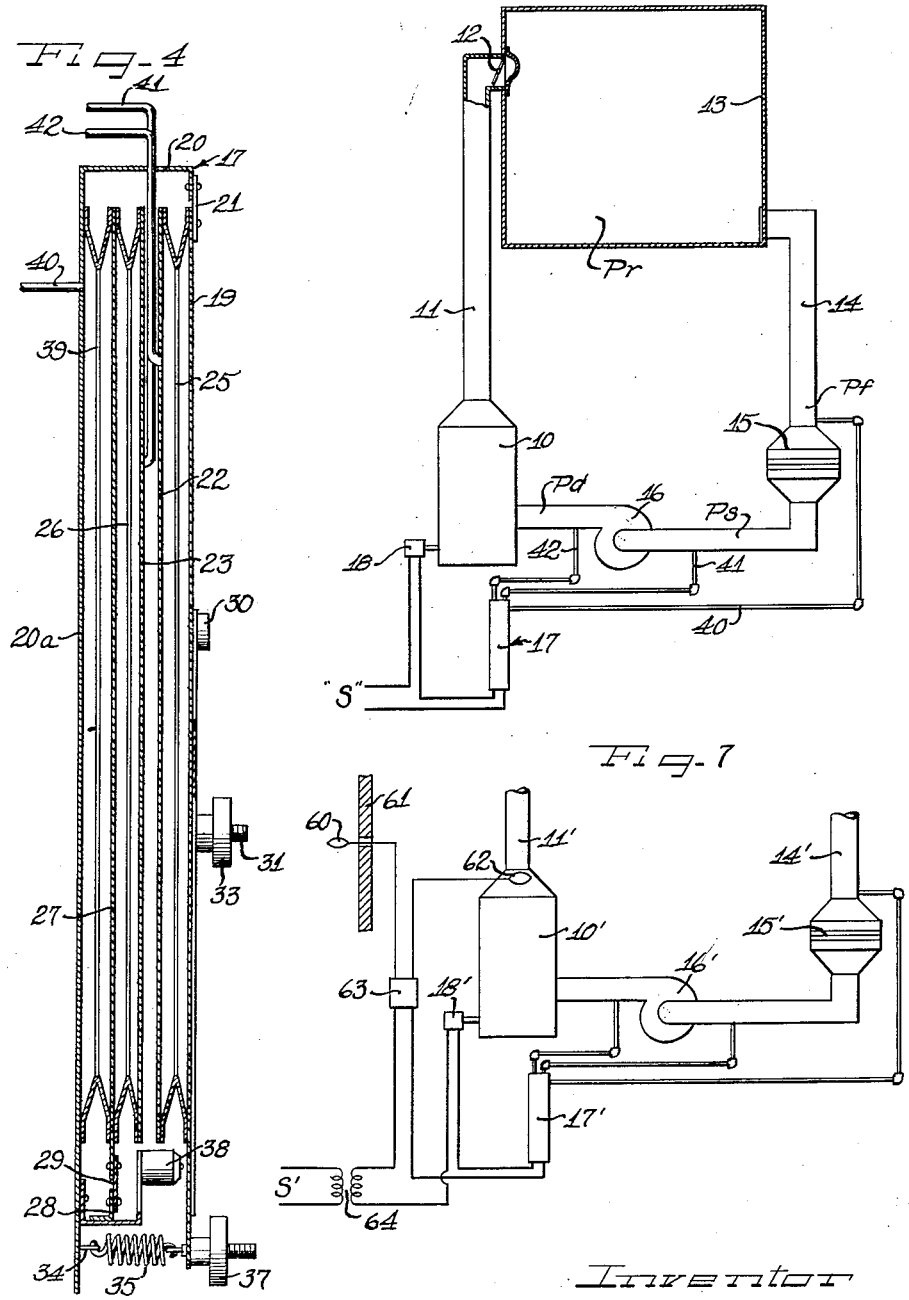
Inventor
Bruce G. Copping.
by Hill, Sherman, Meroni, Gross & Simpson Attys

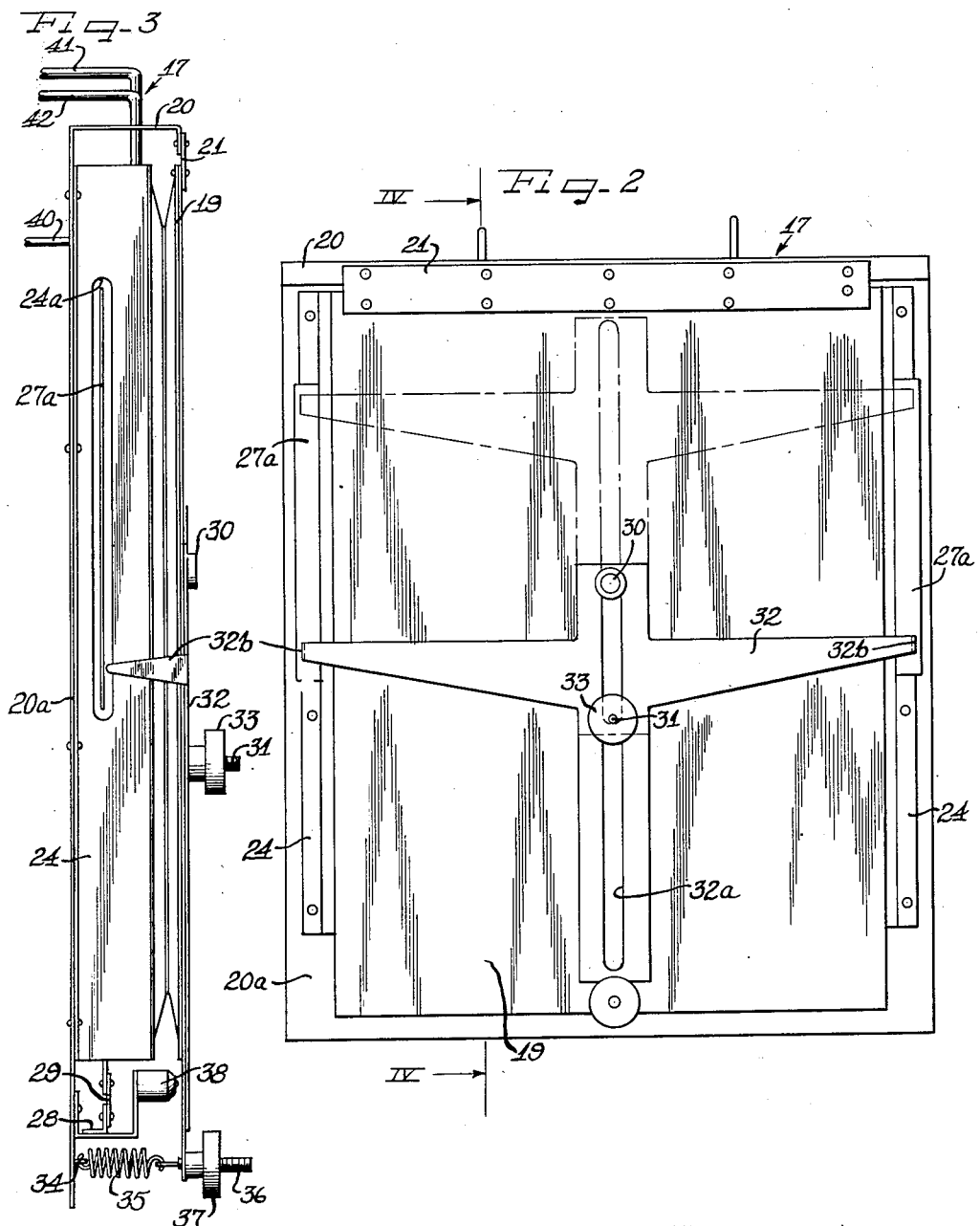

March 3, 1953 B. G. COPPING 2,630,505
PRESSURE SENSITIVE CONTROL DEVICE
Original Filed July 7, 1949 3 Sheets-Sheet 3
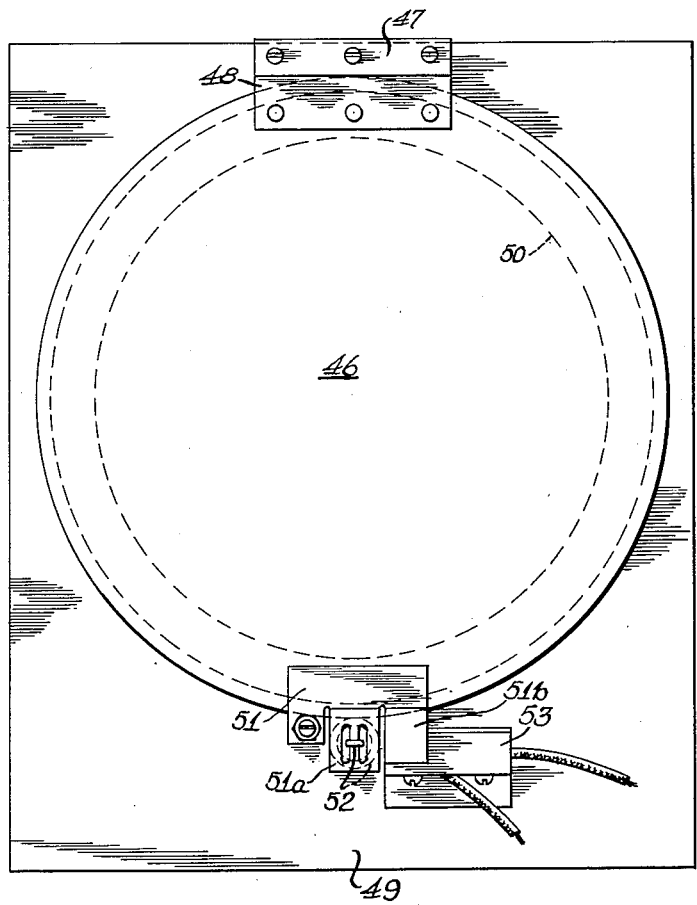
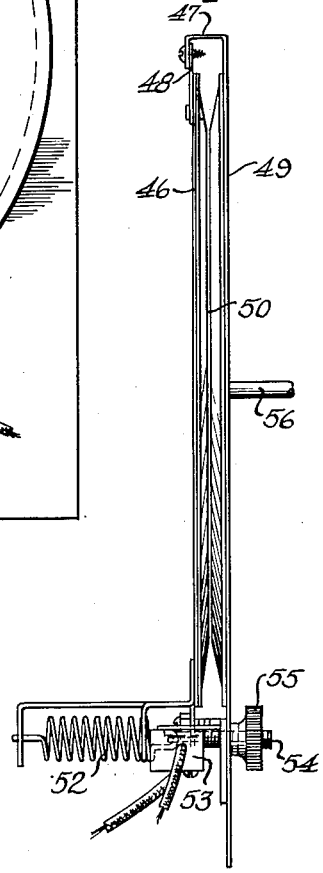
Inventor
Bruce G. Copping Patented Mar. 3, 1953

2,630,505

UNITED STATES PATENT OFFICE 2,630,505

PRESSURE SENSITIVE CONTROL DEVICE

Bruce G. Copping, Cuyahoga Falls, Ohio, assignor to Don Manufacturing Company, Chicago, Ill., a corporation of Illinois Original application July 7, 1949, Serial No. 103,376. Divided and this application December 2, 1950, Serial No. 198,876

7 Claims. (Cl. 200—81.5)

This application constitutes a division of my copending application U. S. Serial No. 103,376, filed July 7, 1949.

The subject invention relates generally to apparatus suitable for operating temperature conditioning systems and more particularly relates to pressure sensitive apparatus adapted to regulate a forced circulation air conditioning system.

According to the general features of the invention, a pressure sensitive control device is provided with a flexible bellows operative to actuate switch means in response to pressure variations within a temperature conditioning system. One form of such a control device disclosed herein provides a plurality of flexible bellows which are arranged in an interrelating relationship so as to permit a compensating reaction of one selected pressure gradient within a temperature conditioning system by one or more additional selected pressure gradients. The switch means is placed in control of an electric circuit connected to a temperature control device in a temperature conditioner such as a furnace. If desired, the compensating device may be connected in series with a pressure sensitive control device, for example, an indoor-outdoor thermostatic control.

It is an object of this invention to provide a pressure sensitive control device for a temperature conditioning system wherein complete compensation for variable filter pressure may be effected regardless of the degree of filter contamination.

A further object of the present invention is to provide a pressure operated control device for a temperature conditioning system which may be connected in series with a suitable compensating device such as an indoor-outdoor thermostatic control.

Many other features, advantages and additional objects of the present invention will become manifest to those versed in the art upon making reference to the detailed description which follows and the accompanying drawings in which—

Figure 1 is a diagrammatic view of a forced warm air heating system adapted for automatic control in accordance with the teachings of the present invention;

Figure 2 is a plan view of a pressure sensitive control device embodying the principles of my invention;

Figure 3 is an end elevational view of the pressure sensitive control device illustrated in Figure 2;

Figure 4 is a cross-sectional view on line IV—IV of Figure 2;

Figure 5 is a plan view of a pressure sensitive control device embodying the principles of my invention, but modified to omit certain structures for accomplishing compensations thereof;

Figure 6 is an end elevational view of the pressure sensitive control device shown in Figure 5; and Figure 7 is a diagrammatic view of a forced warm air heating system similar to that shown in Figure 1, but augmented by an indoor-outdoor thermostatic control.

As shown on the drawings:

Referring to Figure 1, an elementary forced warm air system is diagrammatically shown and comprises a furnace 10, an air duct 11, an automatic thermostatically controlled register 12, a room 13, a return duct 14, an air filter 15 and a blower 16. The basic system is shown as being augmented by a pressure sensitive control device indicated generally by the reference numeral 17 and a furnace control device indicated at 18.

As may be seen on Figure 1, the pressure sensitive control device 17 is placed in communication with the system at a plurality of points which bear a special relation to pre-selected pressure conditions. These points of communication are identified by the reference symbol $P_d$ for pressure at the discharge of the blower 16; $P_s$ for the pressure at the suction side of the blower 16; and $P_f$ for the pressure of the air entering the filter 15. For convenience in explanation, the additional reference symbol $P_r$ is used to indicate the air pressure in the room 13.

In order that the environment to which my invention is particularly applicable may be properly understood, further reference may be made to my copending application U. S. Serial No. 103,376, filed July 7, 1949, in which the theory of operation of a pressure sensitive control system is taken up in great detail.

In Figures 2, 3 and 4, the pressure sensitive control device 17 is shown as including an outer bellows plate 19 which is attached at its upper edge to a bracket 20 by means of a flexible strip 21. The bracket 20 is provided with an integral backing portion which is identified as a main back plate 20a.

Situated in spaced relationship intermediate the main back plate 20a and the outer bellows plate 19 are a pair of bellow supports 22 and 23. As may be seen on Figure 3, the bellow supports 22 and 23 are assembled in fixed relationship with the bracket 20 by means of suitable end members 24 which may be fastened to the main back plate 20a by any suitable fastening means.

An outer bellows 25 made of a flexible material and formed in the usual manner is sealed to the outer bellows plate 19 on one side and the other side is sealed to the bellows support 22.

An intermediate bellows 26 is sealed to the bellows support 23 and the other side is sealed to an inner bellows plate 27. The inner bellows plate 27 is provided with a pair of suitably extending lugs as at 27a which extend through slots 24a formed in the end members 24. The inner bellows plate 27 is hinged by means of a flexible strip 29 to a bracket 28 secured to the main back plate 20a.

As may be seen on the drawings, the outer bellows plate 19 is provided with a projecting guide pin 30 and a threaded stud 31 which are arranged upon the outer bellows plate in spaced relationship upon a substantially centerline axis. A slotted T-shaped member 32 provided with a lengthy slot 32a and a pair of pressure feet 32b is arranged upon the face of the outer bellows plate 19 for sliding adjustment relative thereto. Thus, the threaded stud 31 may receive an adjusting nut 33 in threaded relationship therewith which may be drawn up tightly to maintain the T-shaped member 32 in any desired adjusted position. It will be noted that the pressure feet 32b of the T-shaped member 32 are arranged for contact engagement with the projecting lugs 27a of the inner bellows plate 27.

Since the outer bellows plate 19 hinges around the flexible strip 21, it will be apparent that adjustable positioning of the T-shaped member 32 along the face of the outer bellows plate 19 will vary the point of contact engagement between the pressure feet 32b and the lugs 27a, thereby permitting selective adjustment of the leverage of the inner bellows plate 27 upon the outer bellows plate 19 as may be desired.

A hook 34 is fixed to the main back plate 20a and receives a small resilient member 35 which may take the form of a coil spring. The other end of the resilient member 35 is attached to a hook formed on the end of a threaded stud 36 which is adapted to pass freely through the outer bellows plate 19. The amount of tension exerted by the resilient member 35 upon the outer bellows plate may be selectively adjusted by means of a knurled adjusting screw 37 received on the threaded stud 36.

A sensitive switch 38 which is normally open may be interposed between the main back plate 20a and the outer bellows plate 19 and is arranged in such a manner as to be actuated to a closed position whenever the outer bellows plate 19 moves inwardly beyond a certain predetermined point.

An inner bellows 39 is sealed to the inner bellows plate 27 on one side and the other side is sealed to the main back plate 20a. Air communication is established with the various bellows by means of a filter intake pressure tube 40 which enters the interior of the bellows 39, a blower suction pressure tube 41 which enters the interior of the intermediate bellows 26 and a blower discharge pressure tube 42 which enters the interior of the bellows 25. The pressure tubes 40, 41 and 42 are designated by like reference numerals upon the diagrammatic view of a forced warm air heating system shown in Figure 1.

In the particular structural form of the pressure sensitive control device 17, it will be evident that the blower discharge pressure $P_d$ will be manifested as a positive force whereas the filter intake pressure $P_f$ and the blower suction pressure $P_s$ will both be manifested as a negative force. The blower discharge pressure will tend to force the outer bellows plate 19 against the pull of the resilient member 35 which may be considered a control spring. The negative blower suction pressure will tend to draw the inner bellows plate 27 to the right (Figs. 3 and 4) and thus a force will be transmitted through the pressure feet 32b, thereby assisting the blower discharge pressure in forcing the outer bellows plate 19 against the pull of the resilient member 35. The filter intake pressure, also negative, will tend to move the inner bellows plate 27 to the left (Figs. 3 and 4) and will thus oppose and subtract from the outward force of the blower suction pressure. Thus, the force transmitted to the outer bellows plate 19 will be a certain proportion of the pressure drop through the filter 15, the proportion depending upon the setting of the T-shaped member 32.

In operation, as the temperature of the room 13 rises, the thermostatic register 12 will close and thereby produce an increase of net pressure on the outer bellows plate 19. This increase in pressure will tend to force the bellows plate 19 outward and when a predetermined pressure has been reached, the switch 38 will be actuated to an off position. The switch 38 may be interposed in an electric circuit leading from a source "S" to the burner control device 18. When the switch 38 is actuated to its off position, the burner controlled by the burner control device 18 will be deenergized.

As the room 13 cools, the thermostatic register 12 will open, thereby reducing the net pressure at the pressure sensitive control device 17 and the outer bellows plate 19 will move slightly inward, thereby permitting the switch 38 to be actuated to its closed position to complete the electric circuit and start the burner controlled by burner control device 18. Since the thermostatic register 12 opens and closes in response to the heat requirement of the room 13, it will be evident that the pressure sensitive control device 17 described herein effects a control of burner operation which is directly correlated to the overall heat requirement of the room.

Referring now to Figures 5 and 6, a modified form of pressure sensitive control device is indicated generally by the reference numeral 45 and is shown as comprising a bellows plate 46 which is hinged to a bracket 47 by means of a flexible strip 48. The bracket 47 is provided with a main back plate portion 49. A bellows 50 made of a flexible material and shaped in the usual manner is sealed on one side to the bellows plate 46 and on the other side to the main back plate 49.

A clip angle 51 is provided on one end of the bellows plate 46 and is provided with a projecting portion 51a for carrying a control spring 52 and a second projecting portion 51b which may be arranged in actuating position with a sensitive switch 53.

The other end of the spring 52 may be attached to a threaded stud 54 which passes through the main back plate 49 and is threadedly engaged by a knurled adjusting nut 55. The amount of tension exerted by the spring 52 in biasing the bellows plate 46 towards the main back plate 49 may be selectively adjusted by turning the nut 55 on the threaded stud 54.

A pressure tube 56 enters the interior of the bellows 50 and may, for example, place the bellows 50 in air communication with the plenum chamber, or main air duct of a temperature conditioning system.

As variations in air pressure occur within the plenum chamber, or main air duct of the temperature conditioning system, the bellows 50 will expand, or contract and thereby force the bellows plate 46 to pivot relatively to the bracket 47 through the hinge joint of the flexible strip 48. When this occurs, the clip angle 51 will be moved against the spring bias of the control spring 52 and the projection 51b will be actuated relative to the sensitive switch 53.

Thus, if the sensitive switch 53 is normally closed and is placed in control of a temperature varying source such as a control burner, or a cooler unit, a pressure increase in the bellows 50 in response to a lower heat transfer requirement placed upon the temperature conditioning system will cause the bellows plate 46 to move outwardly and the sensitive switch 53 will be actuated to an open position.

Conversely, if a greater heat transfer requirement is placed upon the temperature conditioning system the bellows 50 will respond to a decrease in pressure within the temperature conditioning system and the bellows plate 46 will move inwardly, thereby moving the projection 51b against the sensitive switch 53. When the sensitive switch 53 is closed, the temperature varying source controlled thereby will again be energized.

It may be noted that the modified control device 45 finds a particularly useful application in controlling temperature varying source units in temperature conditioning systems where filters of constant resistance are employed.

Under certain circumstances it is desirable and advantageous to use, in conjunction with the compensating pressure control described, a so-called indoor-outdoor thermostatic control. Referring particularly to Figure 7, an arrangement is shown whereby such a thermostatic control is employed.

As shown in Figure 7, a temperature conditioning system is diagrammatically illustrated as comprising a furnace 10', and air duct 11' for delivering temperature conditioned air to an automatic thermostatically controlled register situated in a room outlet (not shown), a return duct 14', and air filter 15' and a blower 16'.

According to this invention, the basic system is augmented by a pressure sensitive control device indicated generally by the reference numeral 17' and a furnace control device indicated at 18'. The indoor-outdoor thermostatic control is shown as comprising a thermostatic bulb 60 which is placed outside of the structure to be heated, herein indicated by the reference numeral 61, so as to be exposed to atmospheric temperatures. A second thermostatic bulb 62 is placed in the bonnet of the furnace 10'. The thermostatic bulbs 60 and 62 may be actuatingly connected to a conventional thermostatic control device indicated generally by the reference numeral 63. The thermostatic control device 63, the furnace control device 18' and the pressure sensitive control device 17' may be interposed in an electric circuit in series connection with one another. The electric circuit containing such components is shown on Figure 7 as leading from a source S' through a transformer 64.

The addition of the indoor-outdoor thermostatic control functions to maintain the bonnet temperature of the furnace 10' at a level inversely proportional to the outside temperature as measured by the thermostatic bulb 60. Thus, if the outside temperature is low, the bonnet temperature will be high. By placing such a control in series with the pressure sensitive control device 17', the swing of the bonnet temperature will be limited and the entire temperature conditioning system will yield a more consistent performance.

Although various minor modifications of structure might be suggested by those versed in the art, it should be clearly understood that I wish to embody within the scope of this patent all such modifications as reasonably and properly come within the scope of my contribution to the art.

I claim as my invention:

1. A control device for a temperature conditioning system comprising, in combination, a main back member, an inner bellows plate pivotally mounted on one end of said main back member, an outer bellows plate pivotally mounted on the other end of said back member, a support plate intermediate said inner bellows plate and said outer bellows plate, an outer bellows element sealed to said outside bellows plate and said support plate, an inner bellows element sealed to said main back member and said inner bellows plate, means for transmitting movement of said inner bellows plate to said outer bellows plate and switch means controlled by movement of said outer bellows plate whereby said inner bellows may exert a compensating pressure bias with respect to the pressure bias of said outer bellows in controlling said switch means.

2. A control device comprising, in combination, a main back member, an inner bellows plate pivotally mounted on one end of said back member, an outer bellows plate pivotally mounted on the other end of said back member, an inner support plate fixed to said back member adjacent said inner bellows plate, an outer support plate fixed to said main back adjacent said outer bellows plate, an outer bellows secured to said outside bellows plate and said outer support plate, an intermediate bellows secured to said inner support plate and said inner bellows plate, and an inner bellows secured to said main back member and said inner bellows plate, a switch controlled by said outer bellows plate and a link member carried for adjustable positioning upon said outer bellows plate engageable with said inner bellows plate whereby said inner and intermediate bellows are operable to compensatingly bias said outer bellows plate against the pressure bias of said outside bellows as and for compensated pressure control of said switch.

3. A control device comprising, in combination, a main back member, an inner bellows plate pivotally mounted on one end of said back member, an outer bellows plate pivotally mounted on the other end of said back plate, an inner support plate fixed to said back member adjacent said inner bellows plate, an outer support plate fixed to said main back adjacent said outer bellows plate, an outer bellows secured to said outside bellows plate and said outer support plate, an intermediate bellows secured to said inner support plate and said inner bellows plate and inner bellows secured to said main back member and said inner bellows plate, a switch controlled by said outer bellows plate and a link member carried for adjustable positioning upon said outer bellows plate engageable with said inner bellows plate, said control device further including an adjustable resilient member interposed between said outer bellows plate and said main back member whereby said inner and intermediate bellows are operable to compensatingly bias said outer bellows plate in conjunction with the pressure bias of said outside bellows in overcoming the resilient bias of said resilient member as and for compensated pressure control of said switch.

4. A pressure sensitive control device comprising a frame, a first pivotally displaceable member hinged to one side of said frame, a control spring connected between said frame and said member, a second pivotally displaceable member hinged to the opposite side of said frame, bellows means together with said first and second members forming a plurality of pressure chambers, whereby said members will be pivotally displaceable in response to pressure variations, means defining inlets for said chambers, switch means actuated by one of said members and connecting means between said first and second members, whereby actuation of said switch means will depend on a cumulative pressure effect on said one of said members.

5. A pressure sensitive control device comprising a frame, a first pivotally displaceable member hinged to one side of said frame, a control spring connected between said frame and said member, a second pivotally displaceable member hinged to the opposite side of said frame, bellows means together with said first and second members forming a plurality of pressure chambers, whereby said members will be pivotally displaceable in response to pressure variations, means defining inlets for said chambers, switch means actuated by one of said members and connecting means between said first and second members, whereby actuation of said switch means will depend on a cumulative pressure effect on said one of said members, and said connecting means being adjustably engageable with said member between the respective pivot supports.

6. A pressure sensitive control device for control of an electrical switch comprising, in combination, a frame, an outer bellows having a movable member pivotally mounted on said frame on one end, a resilient support carried by said frame and adjustably connected to the other end of said movable member of said outer bellows, said outer bellows being in control of said switch, an intermediate bellows, an inner bellows, said intermediate and inner bellows carried by an inner bellows plate pivotally mounted on said frame and a link slidingly carried by said movable member of said outer bellows for adjustable positioning thereon, said link adapted to engage said inner bellows plate, whereby pivotal movement of said inner bellows plate in response to pressure variations in said inner and intermediate bellows exerts a compensatory biasing effect upon the biasing movement of said movable member of said outer bellows in overcoming the bias of said resilient support.

7. A pressure sensitive control device for control of an electrical switch comprising, in combination, a frame having spaced apart end portions, an outer bellows mounted on said frame and having a movable portion pivotally mounted on one end portion of said frame in control of said switch, a second bellows arranged on said frame and having a second movable portion pivotally movable on the other end portion of said frame, and a link adjustably carried by said movable portion of said outer bellows and engaging said movable portion of said second bellows at selected adjusted points intermediate the spaced end portions, whereby said second bellows exerts a compensatory effect on said outer bellows in controlling said switch.

BRUCE G. COPPING.

REFERENCES CITED

The following references are of record in the file of this patent:

UNITED STATES PATENTS

| Number | Name | Date |
|---|---|---|
| 1,459,218 | Knaak | June 19, 1923 |
| 2,187,061 | Smith | Jan. 16, 1940 |
| 2,231,532 | Grooms | Feb. 11, 1941 |
| 2,272,249 | Persons | Feb. 10, 1942 |